United States Patent
Lev

[15] 3,678,457
[45] July 18, 1972

[54] INDICATOR FOR AUTOMOBILES

[72] Inventor: Edward R. Lev, 3121 W. Jerome Street, Chicago, Ill. 60645

[22] Filed: June 29, 1970

[21] Appl. No.: 50,676

[52] U.S. Cl.............................340/107, 340/106, 340/103
[51] Int. Cl.......................................................B06q 1/00
[58] Field of Search..................340/106, 107, 339 X, 103, 27

[56] References Cited

UNITED STATES PATENTS

| | | | |
|---|---|---|---|
| 2,851,674 | 9/1958 | Boone | 340/106 |
| 3,226,707 | 12/1965 | Newman et al. | 340/107 |
| 2,500,201 | 3/1950 | Porter | 340/103 |

Primary Examiner—John W. Caldwell
Assistant Examiner—Michael Slobasky
Attorney—Hill, Sherman, Meroni, Gross & Simpson

[57] ABSTRACT

A visual signal indicator for vehicles which has a light unit mountable at the rear of the vehicle which contains a plurality of separate light source containing chambers adapted to reflect light towards one end of the chambers, each chamber being closed at that end by a translucent-opaque screen containing one or more messages illuminated by the light, and a control unit adapted to be attached interiorly of the vehicle, the control unit having switching for selectively activating different chambers of the rear mounted unit, the control unit also including indicator means for indicating which of the rear mounted chambers is illuminated.

2 Claims, 11 Drawing Figures

PATENTED JUL 18 1972
3,678,457
SHEET 1 OF 3
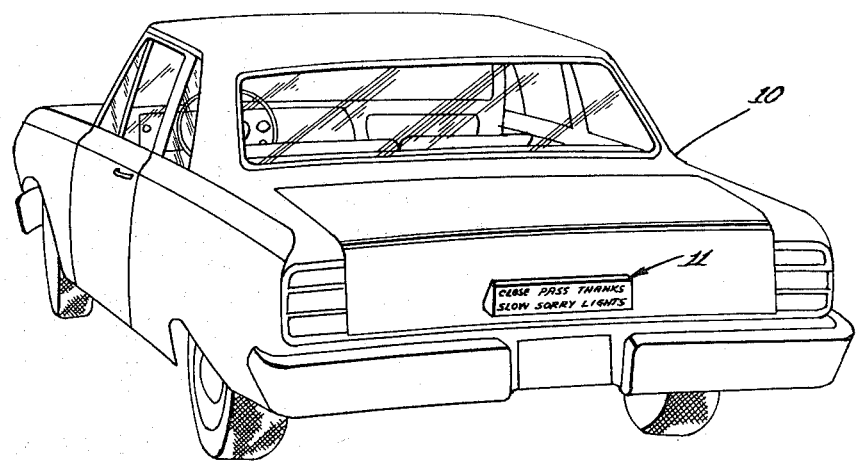
Fig.1
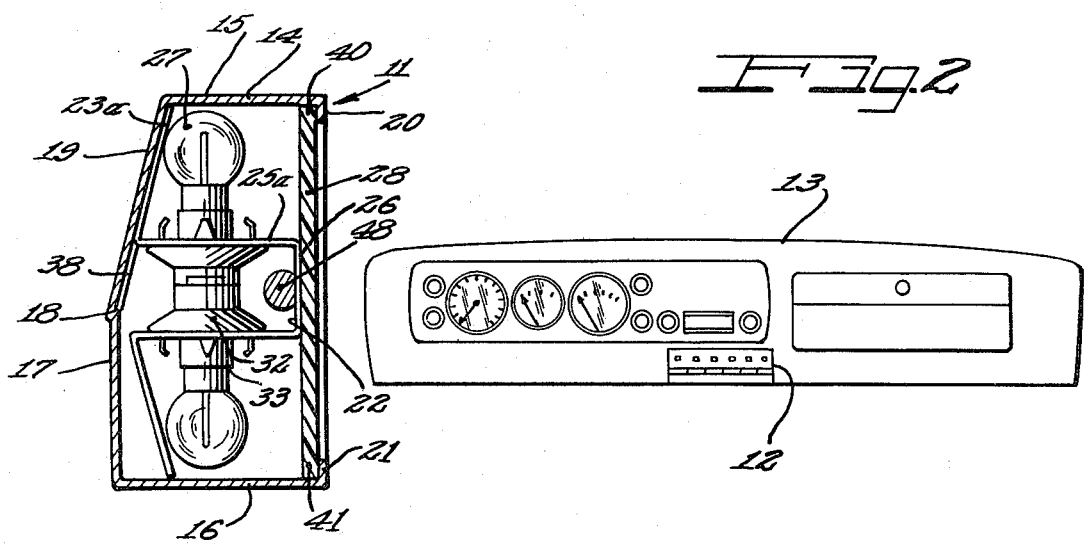
Fig.2
Fig.3
INVENTOR.
Edward R. Lev
BY  Hill, Sherman, Meroni, Gross & Simpson  ATTORNEYS

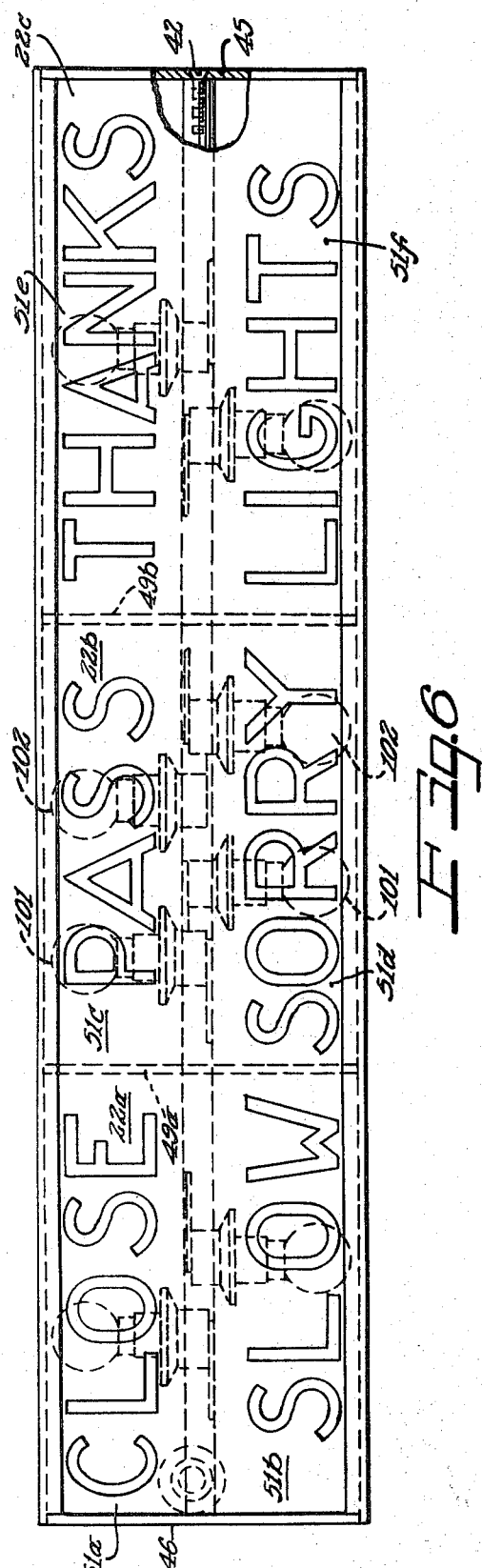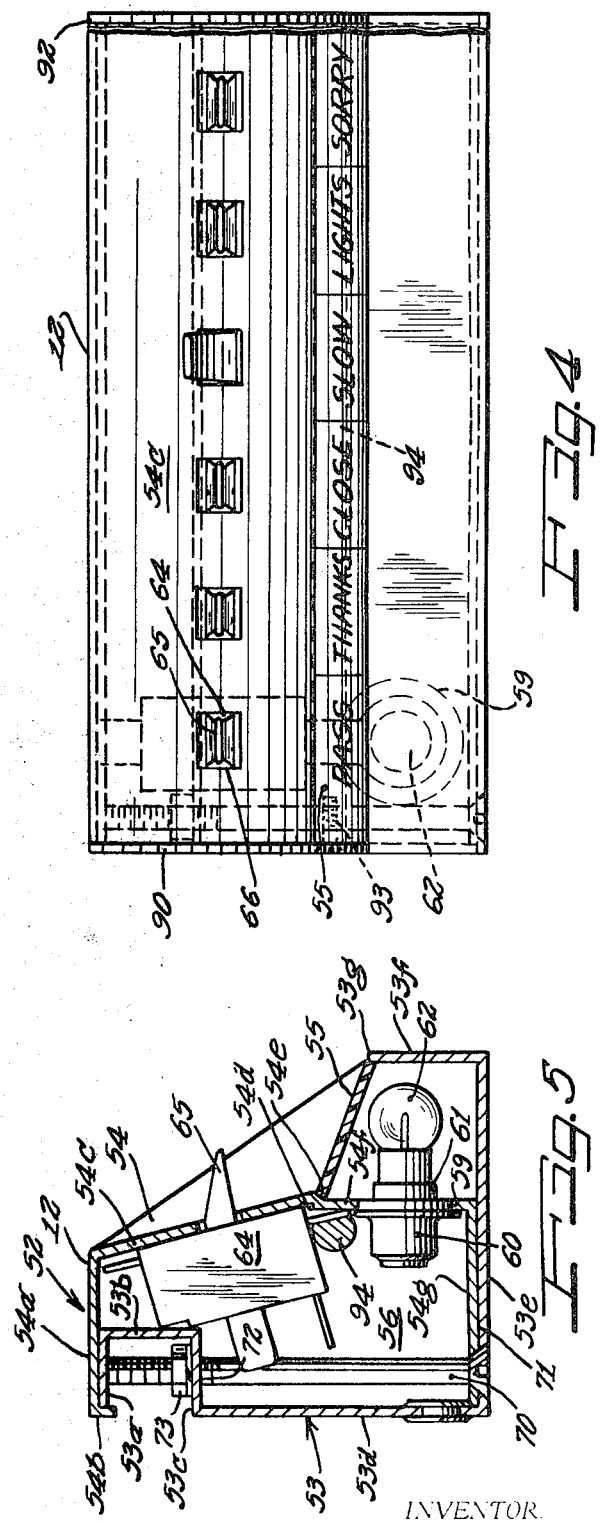
INVENTOR
Edward R. Lev

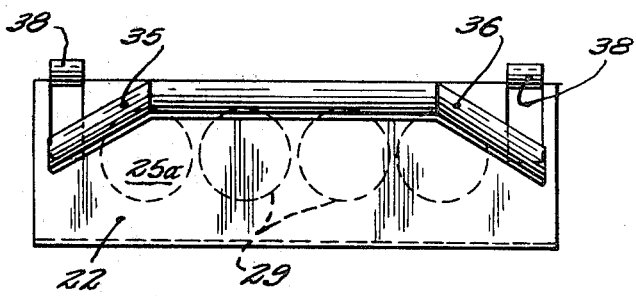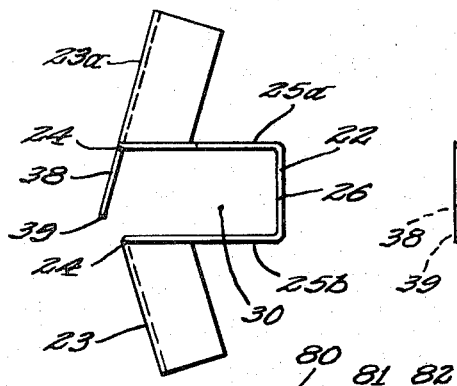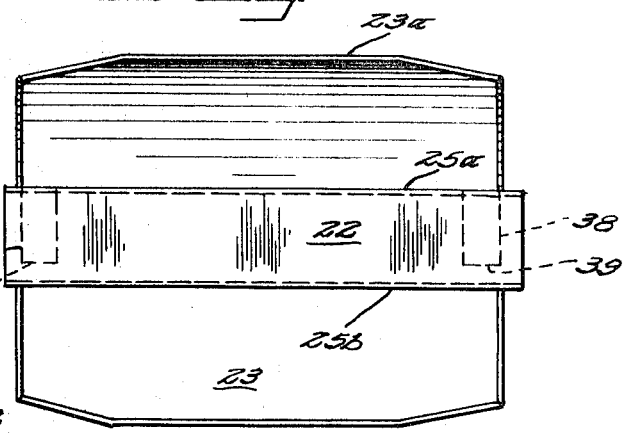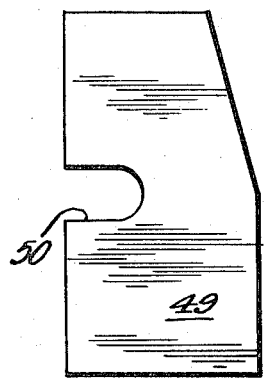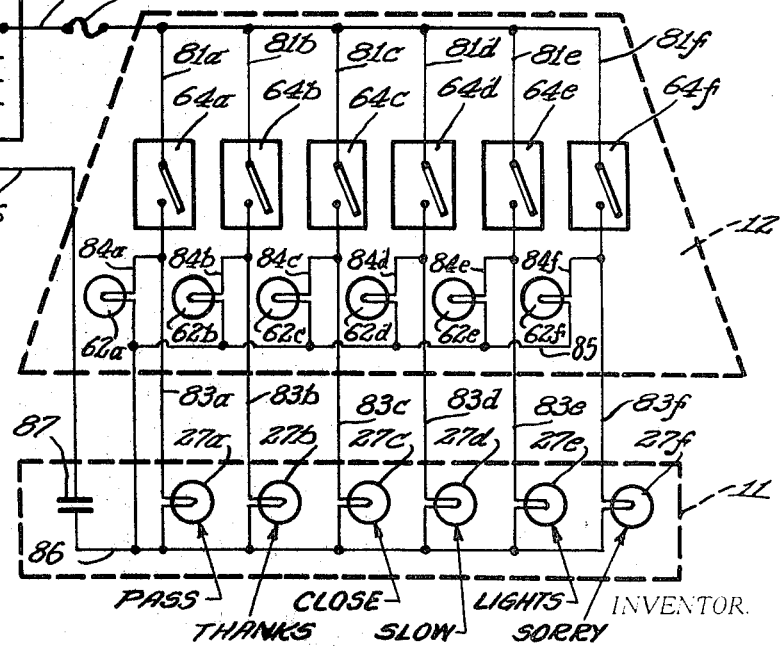

INDICATOR FOR AUTOMOBILES

BACKGROUND OF THE INVENTION

1. Field of the Invention

This invention relates to vehicle signal devices and more importantly to an illuminated signal apparatus for a vehicle.

2. Prior Art

Signal indicators for automobiles are known to the art and include devices which range from the simplicity of a turn signal indicator to those such as illustrated by the U. S. Pat. No. 3,320,586, to Wagner, which indicate a complexity of information. Additionally, it has been known to provide signalling devices capable of material selection in that one of a plurality of messages could be made viewable. In this connection, it is also known to provide invehicle monitor devices for indicating which message is on display. (See for example the patent to Newman et al., U.S. Pat. No. 3,226,707.)

However, it has not been previously known to provide an electronically controlled visual signalling device wherein the control monitor allows positive selection of one or more messages without relation to any sequential display and wherein the control unit indicates which signal, if any, is on display.

SUMMARY OF THE INVENTION

These deficiencies of the prior art are overcome by the present invention which provides an electronically controlled visual signalling device which has a signal unit adapted to be mounted at the rear of a vehicle and which contains a plurality of reflector compartments separated from one another, each of which contains a light source. The reflector compartments have an open end which is closed by an opaque-transparent piece of sheet material with the transparent or translucent portions thereof arranged to form a word or words so that when the light source is activated, a visual signal is projected.

The signal unit is controlled by a control unit which is mounted interiorly of the vehicle adjacent the driver's seat. The control unit includes a series of actuatable switches, each of which controls a light source in the signal unit. The control unit also has a compartment which has a plurality of light sources and is closed by an opaque-transparent or opaque-translucent piece of sheet material containing the same messages as the signal unit. When the switch controlling one of the light sources in one of the compartments of the signal unit is closed, the corresponding light source in the control unit is activated to indicate which of the signal unit messages is being displayed.

In this manner, one or more of the signal unit messages may be selectively displayed with positive identification from the control unit. The fact that a plurality of switches is utilized allows activation of any given message without the necessity of sequentially displaying other messages until the desired message is displayed. Further, the fact that the various switches can be activated at the same time allows more than one of the reflective chambers of the signal unit to be illuminated, thereby allowing two or more word messages to be displayed.

In a preferred embodiment, the electrical system also includes a flasher which causes whichever message is displayed to flash.

It is therefore an object of this invention to provide an improved electronically controlled visual signalling device for vehicles.

It is a further object of this invention to provide a visual signalling device for vehicles which includes a rear-mountable signal unit capable of displaying a plurality of signals and an internal control unit for actuation of said signal unit, the control unit including indicating means for indicating which of these signal unit messages is actuated.

It is yet another and more specific object of this invention to provide an electrical visual signalling device for vehicles which has a rear-mounted signal unit consisting of a plurality of separated reflector chambers, each containing a light source and each having a wall composed of an opaque-translucent panel designed to project a message when the light source is actuated and a control unit having a plurality of switches for individually actuating one of the chambers of the signal unit, the control unit also including separated light source containing indicator compartments actuated by the same switches which indicate which of the signal unit compartments is illuminated.

BRIEF DESCRIPTION OF THE DRAWINGS

Other objects, features and advantages of the invention will be readily apparent from the following description of a certain preferred embodiment thereof, taken in conjunction with the accompanying drawings, although variations and modifications may be effected without departing from the spirit and scope of the novel concepts of the disclosure, and in which:

FIG. 1 is a perspective view of an automobile equipped with the indicator of this invention.

FIG. 2 is a fragmentary plan view of an automobile dashboard equipped with the control unit for the indicator of this invention.

FIG. 3 is a cross-sectional view of the signal unit of the indicator of this invention.

FIG. 4 is a front plan view of the control unit.

FIG. 5 is a cross-sectional view of the control unit of FIG. 4.

FIG. 6 is a plan view of the signal unit of this invention.

FIG. 7 is a top plan view of a reflector for use in the signal unit of this invention.

FIG. 8 is a cross sectional view of the reflector of FIG. 7.

FIG. 9 is a front plan view of the reflector of FIGS. 7 and 8.

FIG. 10 is a plan view of a reflecting divider for the signal unit chambers of this invention.

FIG. 11 is a schematic of the electrical system of the indicator of this invention.

DESCRIPTION OF THE PREFERRED EMBODIMENT

FIG. 1 indicates a vehicle 10 equipped with the indicator of this invention. The vehicle has mounted on the rear thereof a signal unit 11 which is adapted to illuminate various words observable by vehicles following the vehicle 10. The signal unit 11 is activated by a control unit 12 which is mountable in juxtaposition to the dashboard 13 of the vehicle 10, preferably adjacent to the driver's seat.

As best illustrated in FIG. 3, the signal unit 11 consists of a substantially U-shaped housing 14 with parallel top 15 and bottom 16 walls and an angulated back wall 17. The back wall 17 extends upwardly from the bottom wall 16 at substantially right angles thereto approximately half-way to a point where it is stepped outwardly to form an interior ledge 18. Thereafter, the back wall 17 extends outwardly to the top wall 15 in an angled portion 19 approximately 15° from the vertical.

At the forward ends of the top 15 and bottom 16 walls, inturned flanges 20 and 21 are provided.

Preferably the housing 14 is open-ended and may be extruded. Positioned within the housing 14 are one or more reflector members best illustrated in FIGS. 7 through 9. The reflector members 22 are substantially U-shaped with outturned flanges 23 at the free ends 24 of the legs 25 of the "U." The outturned flanges 23, in the preferred embodiment illustrated, are of greater height than the bight portion 26 of the "U." The reflector members 22 are constructed of a highly reflective material such as polished aluminum and serve to direct light from the light sources 27 through the message-carrying face plate 28. The legs 25 of the reflector members have openings 29 therethrough opening to the interior 30 of the "U." As best illustrated in FIG. 7, preferably one opening extends through the top leg 25a and another offset opening extends through the bottom leg 25b, the openings being offset sufficiently so they do not overlap. Electrical light socket fixtures 32 are positioned in the opening 29 with their bulb receiving ends 33 exterior of the bight section of the "U." Light sources 27, preferably bulbs, are received in the sockets.

The lateral ends 35 and 36 of the flanges 23 are bent inwardly at an angle to aid in directing light through the plate 28 and the flanges 23 may be angled toward the front or bight section of the reflectors 22.

Further, a portion 38 of the top leg 25a of the "U" may be cut out at the free end and bent to depend therefrom at an outgoing angle. When the reflector 22 is received in the housing 14 of the signal unit, it is positioned with the flange 23a against the angled portion 19 of the back wall 17 and the ends 39 of the bent-out tab portions 38 contacting the ledge 18 of the back wall so as to firmly position the reflector in place in the housing. The message-carrying face plate 28 is then received in the housing interiorly of the inturned portions 20 and 21 and entrapped between those portions at its top and bottom 40 and 41 and the bight portion 26 of the reflector which backs against the center portion of the plate 28. End plates 45 and 46 are then positioned at either end of the housing 14 and secured thereto by means such as screws 47 extending into the ends of a rod member 48 which extends longitudinally through the housing from end cap to end cap which is positioned within the bight of the reflector.

In order to define separated chambers in the signal unit, a plurality of reflector units 22 may be positioned in the housing separated by dividing walls 49 as illustrated in FIG. 10. The dividing wall 49 is dimensioned so as to block the housing between adjacent reflector units and includes configurations such as the notch 50 allowing passage of the rod 48 through the unit. It can be seen with the signal unit illustrated in FIG. 6 that by use of three reflector units 22a, 22b and 22c, separated by dividers 49a and 49b, that the signal unit will be divided into six compartments in three sets of twos. The compartments 51a through f are formed on the one hand by the top and bottoms of the reflector units separated horizontally one from another by the bight section and on the other hand laterally by the dividing walls 49a and 49b. By providing at least one light source for each compartment, it is therefore possible to provide six separate messages such as those illustrated: PASS, THANKS, CLOSE, SLOW, LIGHTS, SORRY. Inasmuch as each compartment is separated from the others by the combination of the bight section of the reflector units 22 and the dividers 49, activation of one of the lights will illuminate the message carried by the face plate 28 in front of only one of the compartments, the other compartments being maintained in darkness.

It is to be understood that the wording illustrated is suggestive only and that different messages may be desired. Further, it is to be understood that longer messages may be used and that the compartments may be of differing sizes by using different sized reflectors.

The signal unit 11 is actuated by a control unit 12 positioned interiorly of the vehicle. The control unit 12 consists of a multi-piece housing 52 best illustrated in FIGS. 4 and 5. The housing 52 incorporates an outer cover 53, an inner cover 54 and an opaque transparent face plate 55. The face plate 55 has transparent or translucent portions arranged so as to display the same messages as the signal unit across the width of the control unit. The outer cover 53 has a top horizontal part 53a which is integral with a vertical portion 53b which in turn on its other end is integral with a second horizontal portion 53c spaced from the portion 53a in parallel relation therewith to define a U-shaped segment. The outer end of the section 53c is integral with a longer vertical section 53d which forms the major back portion of the housing 52. At its bottom, the portion 53d integral with a horizontal portion 53e which forms the bottom of the control unit. At its other end, the portion 53e is integral with a vertical portion 53f which extends upwardly for a short distance parallel to the back wall 53d and spaced therefrom.

The inner cover 54 includes a horizontal top portion 54a which has a short vertical tab 54b depending from one end thereof and an angled substantially vertical portion 53c depending from the other end thereof. The portion 53c extends downwardly a distance slightly greater than half its length to an inturned horizontal portion 54d which is horizontal for only a short space before being integral with another vertical portion 54f, thereby creating a ledge 54e on the outer face of the cover 54. The portion 54f is integral at its bottom with a portion 54g. The inner and outer covers are assembled one within the other such that the portion 54g of the inner cover 54 lies atop the portion 53e of the outer cover with its free end bottoming against the inside of the back wall 53d and its front portion 54f parallel to and spaced between the wall 53d and the front wall 53f.

The inner cover is locked to the outer cover by having the tab 54b overlie the end of the horizontal portion 53a of the cover 53 with the top of the portion 53a contacting the bottom of the portion 54a. The lens 55 is positioned between the front wall 53f and the portion 54f of the inner cover with the lens extending from the top 53g of the portion 53f to the ledge 54e of the inner cover where it is in abutting relation with the front wall of the inner cover. It can therefore be seen that the control unit is divided into two compartments, the larger of which, numbered 56, is defined by the walls 54a, 54c, 54f, 54g, and 53d, c and b. The smaller compartment 57 is positioned in front of the lower half of the compartment 56 and is defined by the wall 53e, 53f, 54f and the lens 55 along the top of the compartment 57.

The compartment 57 communicates with the compartment 56 through a plurality of openings 59 through the wall 54f. The openings 59 are spaced from one another across the width of the control unit 12 and provide seats for sockets 60 with the bulb receiving ends 61 thereof projecting into the compartment 57. Light sources such as bulbs 62 are received in the socket 60 and positioned within the compartment 57. A plurality of switches 64 are mounted on the back side of the wall portion 54c and are spaced from one another across the width of the unit 12. Preferably the switches 64 are positioned directly above the individual sockets 60. The toggle levers 65 of the switches project through openings 66 in the wall portion 54c exteriorly of the unit 12 above the lens 55.

In the embodiment illustrated the lens is divided into six areas each of which contains markings identical to one of the six compartments 51a through f of the signal unit. The switches 64 above each of the divisions of the lens 55 controls activation of one of the bulbs 62 below the lens marking and activation of one of the compartments 51a through f of the signal unit. Therefore, activation of one of the switches 64 to the "on" position will light both one of the compartments of the signal unit and the light source 62 below the section of the lens 55 which corresponds to the signal unit compartment being lit. Preferably this light 62 will be directly below the actuated switch. The compartment 57 may be subdivided by placing divider members between the light sources 62 thereby blocking off light within the compartment so that actuation of individual light sources will result only in illumination of one segment of the lens 55. Alternatively, because of the use of the control system within the vehicle in close proximity to the operator thereof, it is not necessary to use high-wattage bulbs in the control unit and therefore illumination bleed to adjacent areas of the lens will be minimized and such dividers eliminated.

The control unit housing 52 is secured by means of two elongated bolts 70 which project through apertures 71 in the bottom 53e up through the compartment 56 and through apertures 72 in the wall portion 53c. A nut 73 on the top side of the portion 53c secures the bolt 70. Further, the bolts 70 may be dimensioned sufficiently long so as to contact the under surface 74 of the portion 53a to maintain it in contact with the under surface 75 of the portion 54a.

The sides of the control unit are closed by end caps 90 and 92 secured to the unit by screws 93 threaded into the ends of a rod-like member 94 which passes through the compartment 56 under the bank of switches 64.

FIG. 11 illustrates a simplified schematic diagram for the indicator of my invention wherein both the control unit 12 and the signal unit 11 are in electrical contact with the battery 80 of the vehicle 10 through two primary electrical wires 81 and 86 which are connected to one another through a plurality of parallel circuits. A fuse 82 may be interposed in the circuit such as on he wire 81 and a flasher 87 may be interposed on the circuit such as on the wire 86 so as to sequentially flash the light source bulbs 62a through f and 27a through f. The parallel circuits 81a through f are indicated as depending from the wire 81 to the switches 64 of the control unit indicated as switches 61a through f. The switches in turn are connected to lines 83a through f connecting the switches to the light sources 27a through f of the signal unit so that closing of the switches 64a through f will activate the light sources by completing a circuit consisting of the battery, the wires 81, one of the parallel circuit wires 81a through f, one of the switches 64a through f, the corresponding line 83a through f, the light source 27a through f and the line 86 connected in common to each of the light sources 27a through f, the flasher 87 and the battery 80.

The indicator bulbs 62a through f of the control unit 12 comprise a plurality of parallel circuits with wires 84a through f connecting individually to the wires 83a through f. The light sources 62a through f are operatively connected to the wires 84a through f and to a common wire 85. The wire 85 is connected to the wire 86. Therefore, closure of one of the switches 64a through f will activate a current in the corresponding wire 83a through f which will activate a current in the corresponding wire 84a through f to light one of the bulbs 62a through f. By connecting the wire 85 to the wire 86 prior to the flasher 87, the indicator bulbs in the control unit will also be caused to flash when activated.

It is to be understood that while the preferred embodiment has been illustrated as having six compartments in the signal unit, each of which contains one light source and is activated by a single switch in the control unit, that this arrangement may be altered. For example, in FIG. 6, in an alternate embodiment, one or more of the compartments such as 51c and 51d could have two light sources 101 and 102 disposed therein. The controls could then be arranged so that activation of one switch would light the light source 101 in either of the compartments while activation of another switch lit the bulb 101 in the other compartment. The schematic could be changed so that activation of a third switch would light the bulb 102 in both compartments, thereby lighting both at the same time with one switch. This would be useful if, for example the message indicated in compartment 51c was the word "DON'T" whereas the message indicated in compartment 51d was the word "PASS." In that case, it would be possible with one switch to light the word "PASS" and with a second switch to light both compartments to flash the message "DON'T PASS."

It is of course to be understood that this same effect can be achieved with the preferred embodiment by depressing two switches simultaneously, one of which may activate the signal unit compartment displaying the message "DON't" while the other of which activates the corresponding department displaying the message "PASS."

It can therefore be seen from the above that my invention provided a nea and improved electrically controlled visual signal indicator for vehicles which consists of a signal unit for rear mounting on the vehicle containing a plurality of separated compartments each of which is illuminatable by a light source positioned within the compartment and each of which is equipped with a front plate adapted to display a message. The control unit consists of a housing adapted to be mounted within the vehicle and which has a plurality of individually actuatable switches for controlling the light sources in the signal unit and further which includes light sources and message indicating means for indicating to the operator of the vehicle which message is being displayed by the signal unit.

I claim as my invention:

1. A message signalling device for vehicles which comprises: a signal unit, a control unit for controlling said signal unit, said signal unit including a housing containing a plurality of open-ended separated compartments therein, the open ends being closed by a message-carrying face plate, the face plate being dimensioned to position a different message in front of the open end of each of said compartments, a light source in each of said compartments, the face plate adapted to display a message when one of said light sources is illuminated, the control unit including a housing, a plurality of independently actuatable switches in said housing, a plurality of light sources in said housing, illuminatable message display means associated with said light sources in said housing, and electrical circuitry operatively connecting each of said switches with at least one of the light sources in the said control unit housing and at least one of the light sources in the said signal unit whereby actuation of one of the said switches will illuminate the message means associated with at least one light source in the said control unit and the message displayed on the face plate associated with at least one of the said compartments of the said signal unit, said switches actuatable one at a time and a plurality at a time simultaneously or one after another whereby one or more of the messages displayed on the face plate may be illuminated one at a time or a plurality at a time simultaneously or in sequence to provide message composition creating a single message composed of two or more of the said different messages.

2. A message signalling device for vehicles which comprises: a signal unit having a housing divided vertically and longitudinally into a plurality of separate reflector compartments each of which has an open end, the open ends being aligned to provide a common open end for said housing, a light source in each of said compartments, a message carrying face plate closing said common open end having a plurality of messages thereon, each message aligned with one of said compartments whereby activation of one or more of said light sources will illuminate one or more of said messages, a control unit for controlling said signal unit, said control unit including a plurality of individual switches each of which is adapted to activate one of said light sources in the signal unit, a second plurality of light sources associated with said control unit, message displaying means associated with said second plurality, said means adapted to display one or more messages identical to the messages of the signal unit when one or more of the said second plurality of light sources is activated, said second plurality of light sources controlled by said switches whereby the said switch controlling a given message in the signal unit controls one of said second plurality of light sources to display the identical message from the said means at the control unit, and said switches being activatable independently of one another whereby one or more of said switches may be actuated at a given time so that one or more messages may be simultaneously displayed, whereby message composition is provided allowing display of a single message composed of two or more of the said plurality of messages, the two or more being displayed simultaneously.

* * * * *